W. E. PHILLIPS.

CHILD'S CRADLE.

No. 11,496. Reissued May 21, 1895.

Witnesses
W. C. Collier
E. E. Bartholomew

Inventor
Willis E. Phillips
By Louis K. Gillson
Attorney

THE NORRIS PETERS CO., PHOTO-LITHO., WASHINGTON, D. C.

UNITED STATES PATENT OFFICE.

WILLIS E. PHILLIPS, OF SAGUACHE, COLORADO, ASSIGNOR TO THE JOHNSON CHAIR COMPANY, OF CHICAGO, ILLINOIS.

CHILD'S CRADLE.

SPECIFICATION forming part of Reissued Letters Patent No. 11,496, dated May 21, 1895.

Original No. 528,026, dated October 23, 1894. Application for reissue filed April 9, 1895. Serial No. 545,110.

*To all whom it may concern:*

Be it known that I, WILLIS E. PHILLIPS, of Saguache, in the county of Saguache and State of Colorado, have invented a new and useful Improvement in Children's Cradles, of which the following is a full, clear, and exact description.

My invention relates to an improvement in cradles, and it has for its object to so construct the cradle that it may be readily swung with a long regular motion, the short motion, which is well known to be prejudicial to infants, being overcome.

A further object of the invention is to so construct the cradle that no matter how violently the body of the cradle may be rocked, it will be impossible to throw or move in the least the child contained in the body of the cradle; and to provide a cradle particularly adapted to self moving mechanisms such as clock work, &c.

The invention consists in the novel construction and combination of the several parts, as will be hereinafter fully set forth, and pointed out in the claims.

Reference is had to the accompanying drawings, forming a part of this specification, in which similar figures and letters of reference indicate corresponding parts in both views.

Figure 1:
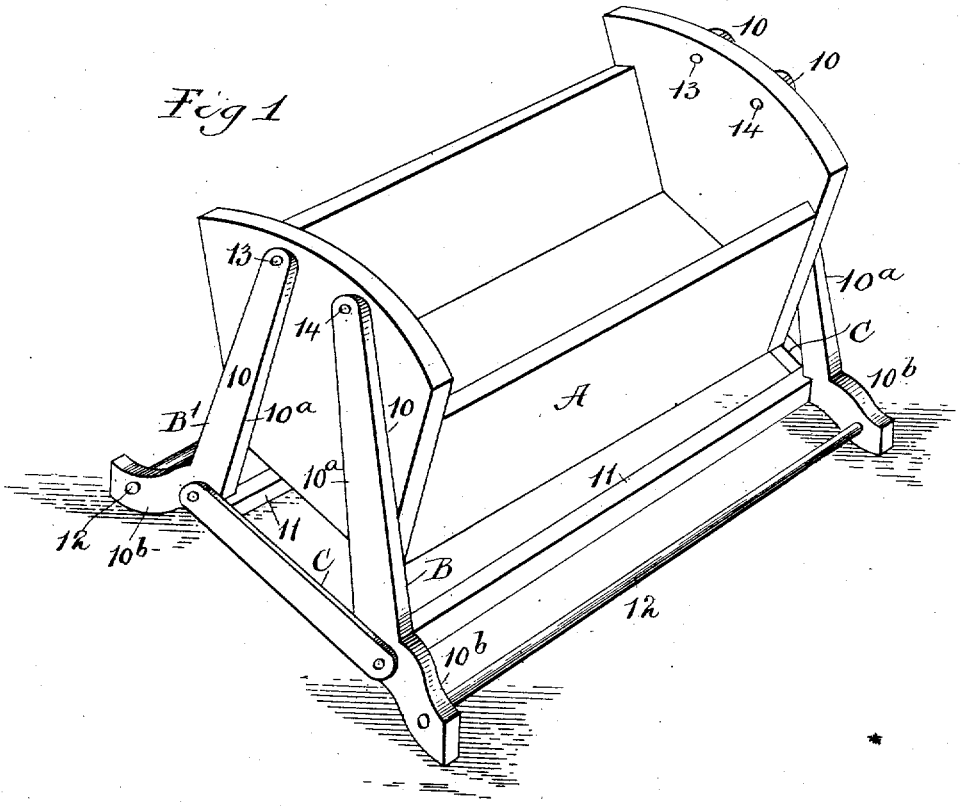
Figure 2:
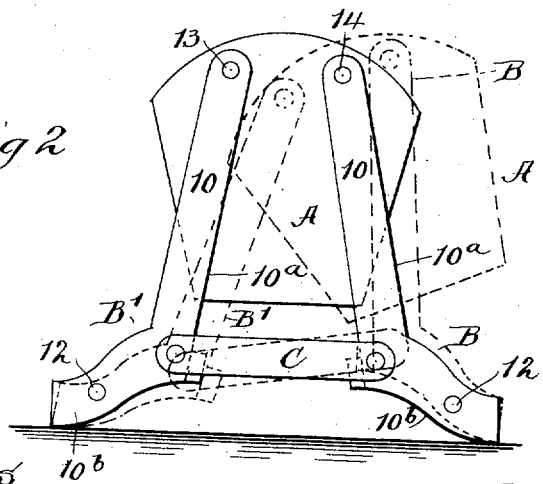

Figure 1 is a perspective view of the improved cradle; and Fig. 2 is an end view thereof, illustrating the cradle at rest in positive lines and at one portion of its side throw in dotted lines.

In carrying out the invention the body or basket A of the cradle may be given any shape or be given any design that fancy may dictate.

In addition to the body the cradle consists of what may be termed two pivotal supports B and B′ and links C connecting said supports. Each pivotal support consists of two legs 10, and each leg comprises what may be termed a body $10^a$ which is more or less straight, and a foot section $10^b$, which is more or less of an acute angle to the body and extends outward beyond the front edge. This foot is curved more or less in a downwardly direction, the bottom only of the lower portion resting upon the floor or other support, in order that a predetermined amount of space may intervene between the support upon which the leg rests and the bottom of the body section of the cradle.

Each set of legs 10 is preferably connected by a cross bar 11, secured to the inner face of the lower portion of the body sections of the legs in any suitable or approved manner, and a round 12, which serves to connect the foot sections of the legs.

Each end of the cradle body A is provided with two pins 13 and 14, located one at each side of the center; and the legs of one support are pivoted upon the pins 14 while the legs of the other support are pivoted upon the pins 13, the connection between the pins and the legs being at or near the upper ends of the latter. The space between the top portions of opposing legs at the ends of the cradle body however, is much less than the space between the bottom portions, of the body sections of the legs, and corresponding legs of both of the supports B and B′ are connected, that is, each set of opposing legs, by a link C, the connection being a pivotal one, and the links are attached to the legs at the junction of their body and their foot sections, or practically so.

When a cradle is constructed as above set forth, and placed upon a support, by simply pressing against either of the rounds 12, or against the upper portion of the foot section of either of the legs, both of the supports B and B′ will be given a rocking movement, and a similar movement will be communicated to the body.

It is essential that the legs should be closer at the top than at the base, and while the body of the cradle rocks on a swing like a pendulum, it also moves in the direction it is swung, by the action of its supports. The nearer the upper distance and the spread of the legs on the floor coincide, the greater will be the motion to and fro. The cradle is held upright by the gravity of the body, and when swung the same force will return it to the perpendicular.

By reason of the peculiar swinging movement imparted to the body by the movement of the legs, the principle of the pendulum is destroyed, and the beat of the cradle to and fro will be long, sweeping and regular. For example, a cradle fourteen inches deep, constructed as shown in the drawings will make about twenty-six beats or swings per minute, and if the same cradle were swung from a stationary point it would swing at least fifty times per minute; more if the weight of the child should raise the center of gravity perceptibly, which it would do. By destroying the principle of the pendulum in the movement of the cradle body, I obtain a longer and slower swing than can be had by other convenient methods. Thus a saving of floor space can be obtained without diminishing the size or swing of the cradle.

In Fig. 2 it will be observed practically to what extent the body may be carried in direction of its swing by the uprights; and in the same view the position of the uprights, when the cradle is in swinging action, is clearly defined. A short quick motion in the swing of a cradle body is well known to be prejudicial to the health of infants. The long regular swing in the improved cradle overcomes this objection, and no matter how violent the rocking may be, it is evident that it will be practically impossible to throw or move a child located in the body of the cradle in the least; and furthermore, as heretofore stated, the operation of rocking the cradle is rendered particularly convenient, since a regular pressure of the foot upon the foot section of either leg of the cradle, or upon the rounds connecting said sections, is all that is necessary. Therefore this cradle is particularly adapted to self-moving mechanisms, such as clock work, electric motors, or motors of other descriptions.

When the body is at rest, the links C will be substantially parallel with the floor, or with whatever other support upon which the cradle may be placed.

This cradle is especially adapted for use with a canopy top, since no matter how far the body is swung the canopy will not swing and therefore does not consume power.

Having thus described my invention, I claim as new and desire to secure by Letters Patent—

1. In a cradle, the combination with the body, of two longitudinally extending laterally rocking frames below and at opposite sides of the body, each frame having an upwardly extending member at each end, each of such members being pivotally attached to an end of the body and upon the same side of its central vertical line as the location of the frame of which it forms a part, and link connection between the frames, substantially as set forth.

2. In a cradle, the combination with the body, of a pair of longitudinal frames or supports, below the body and provided with upwardly extending arms, or members, at each end in pivotal engagement with the body, such supports and their upwardly extending arms being wholly upon opposite sides of the central vertical line of the body, and link connection between the frames or supports, substantially as set forth.

3. In a cradle, the combination with the body, of two legs pivotally attached to each end of the body and upon opposite sides of its central vertical line, and bearing away from each other downwardly from their pivotal attachment to the body, rails or cross-bars rigidly connecting the legs upon the same side of the body, and link connection between the legs upon opposite sides of the body, substantially as set forth.

4. In a cradle, the combination with a body, of opposing supports, each support consisting of connected legs, one at each end of the body, the opposing legs being pivotally connected upon opposite sides of the center of the body, and bearing away from each other downwardly from such pivotal connection, each leg comprising a body portion pivoted to the body of the cradle, and a foot adapted to rest upon a support and at an angle to the body, and link connection between the opposing supports, substantially as and for the purpose set forth.

WILLIS E. PHILLIPS.

Witnesses:
C. S. CORNELIUS,
B. P. STUBBS.